US 9,442,503 B2

(12) United States Patent
Rutkowski et al.

(10) Patent No.: US 9,442,503 B2
(45) Date of Patent: Sep. 13, 2016

(54) NEGATIVE CURRENT SENSE FEEDBACK FOR REVERSE BOOST MODE

(71) Applicant: QUALCOMM Incorporated, San Diego, CA (US)

(72) Inventors: Joseph D Rutkowski, Chandler, AZ (US); Lennart Karl-Axel Mathe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 13/752,197

(22) Filed: Jan. 28, 2013

(65) Prior Publication Data
US 2014/0210433 A1    Jul. 31, 2014

(51) Int. Cl.
G05F 1/00       (2006.01)
G05F 1/618      (2006.01)
H02M 3/156      (2006.01)
H02M 1/00       (2006.01)

(52) U.S. Cl.
CPC .............. *G05F 1/618* (2013.01); *H02M 3/156* (2013.01); *H02M 3/1563* (2013.01); *H02M 2001/0009* (2013.01)

(58) Field of Classification Search
CPC .. H02M 3/156; H02M 3/157; H02M 3/1563; H02M 2001/0009
USPC ............... 323/224, 282, 284, 285, 286, 288; 307/127
See application file for complete search history.

(56) References Cited

U.S. PATENT DOCUMENTS

| 3,417,321 | A  | 12/1968 | William |
| 6,091,297 | A  | 7/2000  | Bar-David et al. |
| 6,437,641 | B1 | 8/2002  | Bar-David |
| 6,492,867 | B2 | 12/2002 | Bar-David |
| 6,831,519 | B2 | 12/2004 | Bar-David et al. |

(Continued)

FOREIGN PATENT DOCUMENTS

| GB | 2472111 A    | 1/2011 |
| WO | 2012109680 A2 | 8/2012 |

OTHER PUBLICATIONS

Dallago E., et al., "Lossless Current Sensing in Low-Voltage High-Current DC/DC Modular Supplies", IEEE Transactions on Industrial Electronics, IEEE Service Center, Piscataway, NJ, USA, vol. 47, No. 6, Dec. 1, 2000, XP011023747, ISSN: 0278-0046 figure 4, pp. 1249-1252.

(Continued)

*Primary Examiner* — Adolf Berhane
*Assistant Examiner* — Alex Torres-Rivera
(74) *Attorney, Agent, or Firm* — Arent Fox LLP (57) ABSTRACT

Techniques for providing negative current information to a control loop for a buck converter in reverse boost mode. In an aspect, negative as well as positive current through an inductor is sensed and provided to adjust a ramp voltage in the control loop for the buck converter. The techniques may prevent current through the inductor during reverse boost mode from becoming increasingly negative without bound; the techniques thereby reduce settling times when the target output voltage is reduced from a first level to a second level. In an aspect, the negative current sensing may be provided by sensing negative current through a charging, or PMOS, switch of the buck converter. The sensed negative current may be subtracted from a current used to generate the ramp voltage.

17 Claims, 10 Drawing Sheets

(56) References Cited

U.S. PATENT DOCUMENTS

| | | | |
|---|---|---|---|
| 6,985,039 | B2 | 1/2006 | Bar-David et al. |
| 7,046,090 | B2 | 5/2006 | Veinblat |
| 7,257,384 | B2 | 8/2007 | Bar-David et al. |
| 7,710,203 | B2 | 5/2010 | Bar-David et al. |
| 7,782,132 | B2 | 8/2010 | Plotnik et al. |
| 7,899,417 | B2 | 3/2011 | Elia |
| 7,932,780 | B2 | 4/2011 | Elia |
| 7,936,160 | B1 | 5/2011 | Sheehan |
| 8,107,902 | B2 | 1/2012 | Elia |
| 8,193,860 | B2 | 6/2012 | Cohen |
| 8,248,044 | B2 | 8/2012 | Brown et al. |
| 2006/0044843 | A1* | 3/2006 | Oswald et al. ............ 363/19 |
| 2009/0098846 | A1 | 4/2009 | Elia |
| 2009/0273325 | A1* | 11/2009 | Nakahashi ............ H02M 3/156 323/282 |
| 2010/0066333 | A1* | 3/2010 | Noda ................ H02M 3/156 323/282 |
| 2010/0127684 | A1* | 5/2010 | Iliasevitch ................ 323/285 |
| 2011/0050185 | A1 | 3/2011 | Notman et al. |
| 2011/0101949 | A1 | 5/2011 | Lopata et al. |
| 2012/0212204 | A1 | 8/2012 | Philbrick et al. |
| 2012/0306586 | A1* | 12/2012 | Wan et al. ................ 332/109 |

OTHER PUBLICATIONS

International Search Report and Written Opinion—PCT/US2014/012392—ISA/EPO—May 22, 2014.

Partial International Search Report—PCT/US2014/012392—ISA/EPO—Apr. 2, 2014.

* cited by examiner

NEGATIVE CURRENT SENSE FEEDBACK FOR REVERSE BOOST MODE

BACKGROUND

1. Field

The disclosure relates to techniques for utilizing negative current sense feedback in a buck converter.

2. Background

Buck converters are commonly used in electrical devices to step down a voltage from a first level (e.g., from a battery source) to a lower second level. In typical applications, buck converters source current to a load, and are not usually configured to sink current from a load. In these applications, when it is desired to decrease the target output voltage level of the buck converter, the buck converter will reduce the current sourced to the load, or stop providing current to the load, thus relying on the load to eventually discharge the output voltage to the desired value. If the load resistance is small, then it could take a long time for the output voltage to be discharged to the lower target level.

In one prior art implementation of a current mode buck converter (e.g., one that forces a continuous condition mode, or CCM), the inductor current is allowed to go negative during a "reverse boost mode." In reverse boost mode, the inductor can draw current away from the load, thereby allowing the buck converter to discharge the load more quickly. In such prior art implementations, however, the inductor current can grow increasingly negative without bound. Furthermore, when the output voltage reaches the lower target level, the negative inductor current would still need to be brought back to a positive level to drive the load. This undesirably causes undershoot, and prolongs the settling time of the system.

It would be desirable to provide techniques for configuring a buck converter in reverse boost mode to reduce output voltage undershoot and settling time during target level transitions.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. In this specification and in the claims, the terms "module" and "block" may be used interchangeably to denote an entity configured to perform the operations described.

Figure 1:
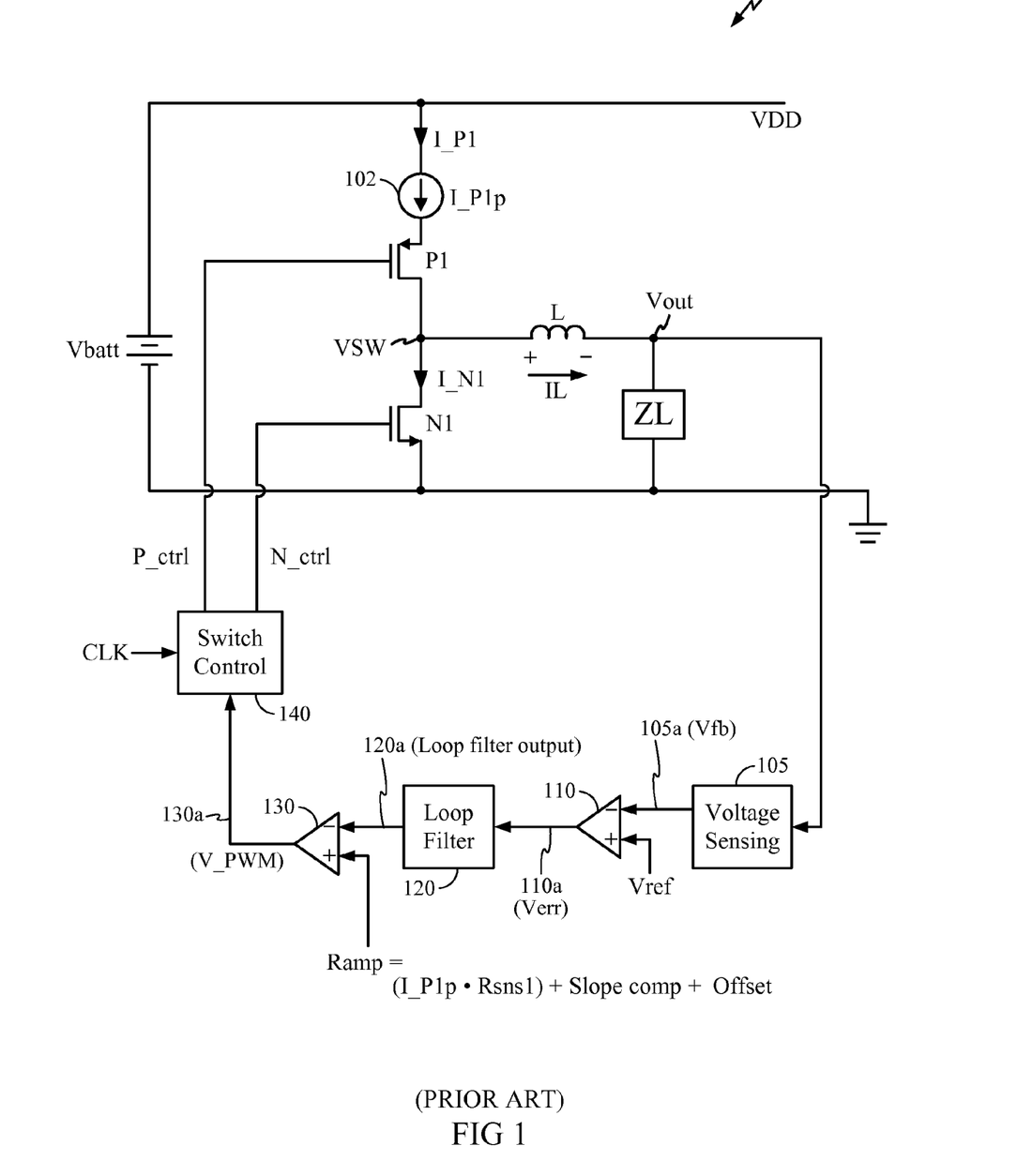
FIG. 1 illustrates a prior art implementation of a buck converter.

FIG. 1 illustrates a prior art implementation of a buck converter 100. Note FIG. 1 is shown for illustrative purposes only, and is not meant to limit the scope of the present disclosure. For example, it will be appreciated that the techniques of the present disclosure may readily be applied to other buck converter implementations (not shown) incorporating e.g., alternative types of switches, circuit topologies, feedback configurations, etc. Such alternative exemplary embodiments are contemplated to be within the scope of the present disclosure.

In FIG. 1, the buck converter 100 includes an input, e.g., a battery generating a voltage level Vbatt, and switching transistors P1 and N1 configured by a switch control block 140 to alternately charge and discharge an inductor L. The inductor is coupled to a load ZL, and current from the inductor L supports an output voltage Vout at the load. The current through P1 is labeled I_P1, and the current through N1 is labeled I_N1. A positive current sensor 102 is further provided for sensing a positive component I_P1p of I_P1, wherein "positive" I_P1 is defined herein as flowing in the direction from P1's source to P1's drain, as labeled in FIG. 1. The node coupling the drains of P1 and N1 supports a switching voltage VSW. The switch control block 140 controls the switches N1, P1 based on an input signal 130a derived from Vout, e.g., according to a control loop mechanism as further described hereinbelow.

In particular, a voltage sensing block 105 senses the output voltage Vout and generates a signal 105a (or "Vfb"). An amplifier 110 subtracts Vfb from a reference voltage Vref to generate an amplified output error signal 110a (or "Verr"). Verr is filtered by a loop filter 120 to generate signal 120a (or "Loop filter output"). Loop filter output is compared to a term "Ramp" by a PWM comparator 130. When P1 is on, Ramp may be computed as follows (Equation 1):

$$Ramp = (I\_P1p \cdot Rsns1) + Slope\ comp + Offset;$$

wherein I_P1p is the sensed positive current through P1, Rsns1 is a resistance (not shown in FIG. 1), Slope comp is a slope compensation term, and Offset is a ramp offset term.

Note during every cycle, when P1 is off, the control block 140 may reset the value of Ramp back to Offset. In particular, when P1 is off, I_P1p automatically goes to zero, while the Slope comp term may be manually reset by the control block 140. The output signal 130a of comparator 130 may be a pulse-width modulated (PWM) output voltage, or V_PWM. V_PWM is provided to the switch control block 140, which generates gate control voltages P_ctrl and N_ctrl for P1 and N1, respectively, to turn the transistor switches on and off.

It will be appreciated that the buck converter output voltage Vout may be configured to approach a target voltage level by, e.g., appropriately setting the reference voltage Vref or by adjusting the divide ratio in block 105. Note as Ramp is generated in part based on the sensed P1 current I_P1 (e.g., through the positive component I_P1p of I_P1 shown in Equation 1), the control of the buck converter 100 may also be referred to as a type of "current-mode control."

Figure 2:
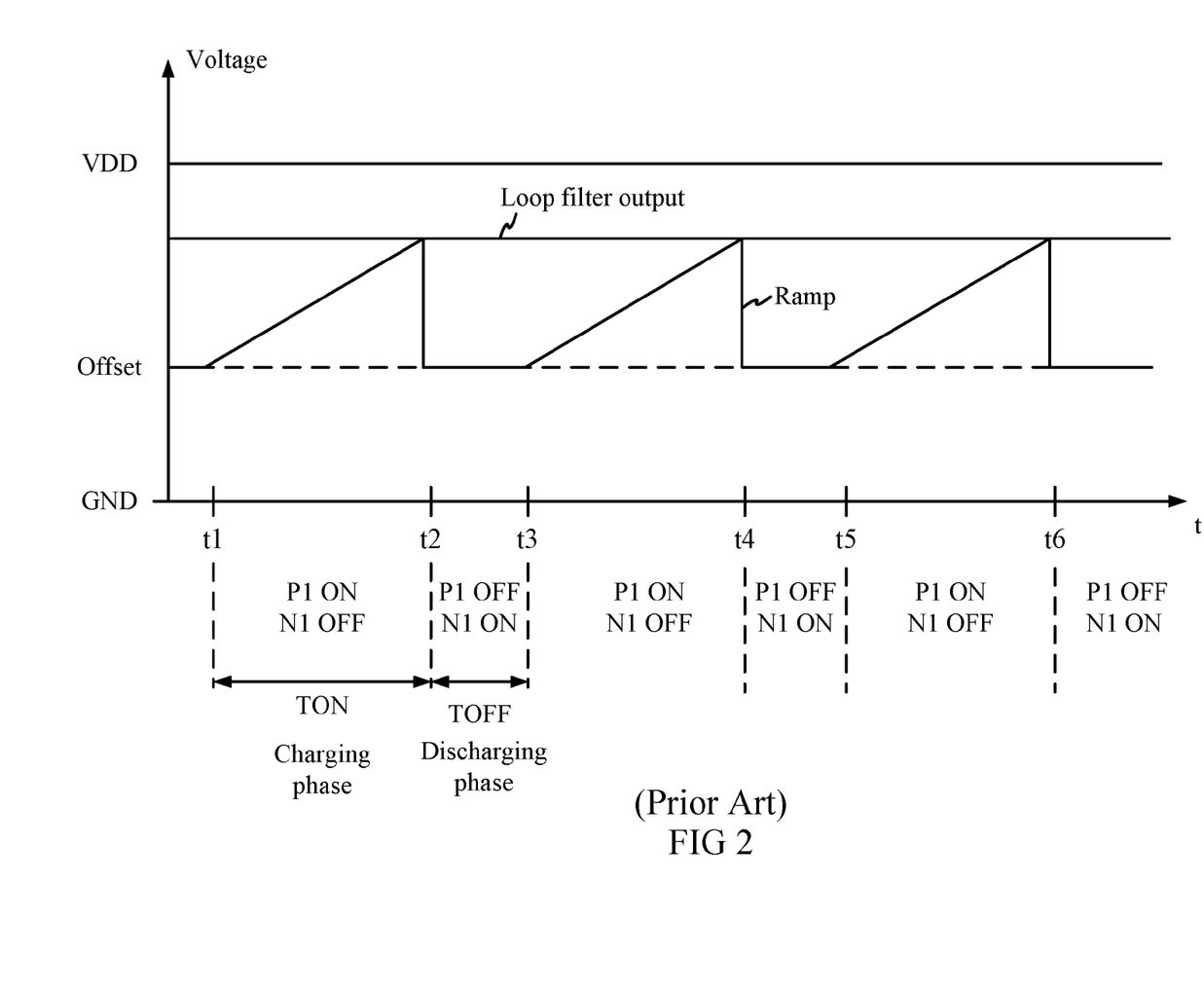
FIG. 2 illustrates exemplary signal waveforms present in the buck converter when Vfb≈Vref, e.g., during steady-state operation of the buck converter.

FIG. 2 illustrates exemplary signal waveforms present in the buck converter 100 when Vfb≈Vref, e.g., during steady-state operation of the buck converter 100. Note FIG. 2 is only meant to illustrate buck converter operation during one possible time interval and corresponding to one possible regime of operation, and is not meant to suggest any type of fixed or general relationships between the signals shown.

In FIG. 2, the buck converter 100 is synchronized to a clock signal CLK, and P1 is enabled at the beginning t1 of a first cycle. From time t1 to t2, P1 is on and N1 is off. This time interval has a duration of TON, and is also denoted a "charging phase," as during this time a positive voltage drop of (Vbatt−Vout) is expected across L to charge the inductor with a positive current IL. During the charging phase, the signal Ramp is seen to increase from a level Offset at t1 up to the Loop filter output at t2, due to the increasing inductor current and also the ramping characteristics of Slope comp. Referring to FIG. 1, it can be seen that at time t2, when Ramp is no longer less than Loop filter output, V_PWM will toggle from low to high.

Responsive to this toggling in V_PWM, the switch control block 140 will re-configure switches P1, N1 so that N1 is on and P1 is off, starting at t2. The interval from time t2 to t3 has a duration of TOFF, and corresponds to a "discharging phase," wherein the current IL through L decreases, i.e., IL is discharged through ground via N1. Note the interval from time t2 to t3 may correspond to an interval wherein Ramp is reset back to Offset. At t3, a new cycle of CLK begins, and the discharging phase transitions back to the charging phase.

Figure 3:
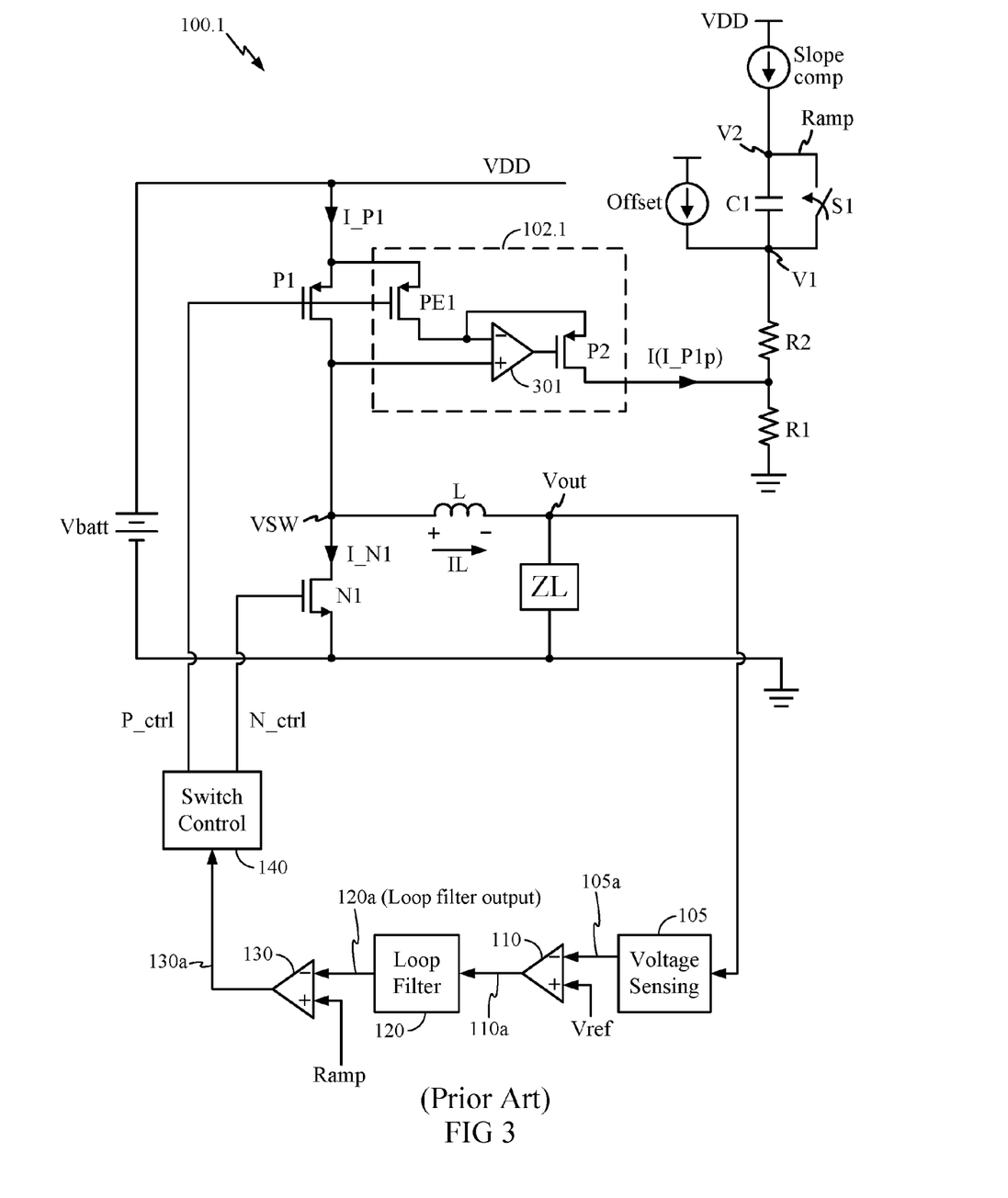
FIG. 3 illustrates an exemplary implementation of the buck converter shown in FIG. 1.

FIG. 3 illustrates an exemplary implementation 100.1 of the buck converter 100 shown in FIG. 1. Note FIG. 3 is shown for illustrative purpose only, and is not meant to restrict the scope of the present disclosure to any particular implementation of a buck converter or positive current sensing block shown.

In FIG. 3, a positive current sensor 102.1 is provided for sensing the positive current I_P1p through P1. In particular, sensor 102.1 includes a feed-through PMOS transistor PE1 coupling the positive supply voltage (Vbatt) to a negative (−) input of an amplifier 301 when P1 is turned on. The positive (+) input of amplifier 301 is coupled to the drain voltage (VSW) of P1. In this manner, amplifier 301 generates a voltage proportional to (VSW−Vbatt) at the gate of PMOS transistor P2. A positive source-to-drain voltage drop across P1 (e.g., due to series on-resistance of P1) will thus be amplified by 301 and coupled to the gate of P2, which will generate a drain current I(I_P1p) that is a function of the positive current I_P1p through P1.

From the sensor 102.1, the generated current I(I_P1p) combines with the current Offset to generate a voltage V1 across R1 and R2. V1 is coupled to a first plate of a capacitor C1. At the same time, a current source Slope comp generates a voltage V2 at a second plate of C1. The voltage V2 between the second plate of C1 and ground, also labeled "Ramp" in FIG. 3, corresponds to the voltage Ramp that may be provided to PWM comparator 130. Note a reset switch S1 is provided to periodically reset the voltage across C1, e.g., S1 may be held in reset until the beginning of every cycle based on a control signal (not shown) generated by block 140.

It will be appreciated that by setting the reference voltage Vref at amplifier 110, or by adjusting the voltage sensing divide ratio in block 105, the duration of TON relative to TOFF may be adjusted such that Vout is configured to approach a desired target level. In particular, when it is desired to decrease Vout, TON may be decreased (and TOFF increased), thereby reducing the current IL delivered to the load each cycle. Conversely, when it is desired to increase Vout, TON may be increased (and TOFF decreased), thereby increasing the current IL delivered to the load each cycle.

To rapidly reduce Vout, N1 is enabled to discharge Vout. In certain cases, there may then be a large negative voltage applied across the inductor, causing the inductor current to quickly ramp down. If N1 is enabled for a long enough duration, then the inductor current flow may eventually become net negative. In certain implementations of buck converters, to prevent negative current flow through the inductor L, N1 is automatically disabled once the current IL becomes negative, at which point P1 and N1 are both turned off. In this event, if it is desired to further reduce the output voltage Vout, then the load ZL is relied upon to discharge the output voltage Vout, as there is no other significant current discharge path available. Note if the load impedance ZL is small, then it may take a long time for Vout to reach the final target value.

In certain implementations, to increase the rate at which Vout may be reduced, the inductor current IL may be allowed to become negative, i.e., the inductor L may sink current IL from the load ZL through ground. This mode of operation is also known as a "forced continuous condition mode (CCM)" or "reverse boost mode" of the buck converter. Note that during reverse boost mode, IL may flow from ZL through N1 through ground when N1 is on. Furthermore, IL may flow from Vout through P1 through Vbatt when P1 is on. In effect, when N1 is on and P1 is off, and the inductor current is negative, then energy is transferred from the load into the inductor. Subsequently, when N1 is off and P1 is on, the energy stored in the inductor is returned to the input, e.g., the battery.

Figure 4:
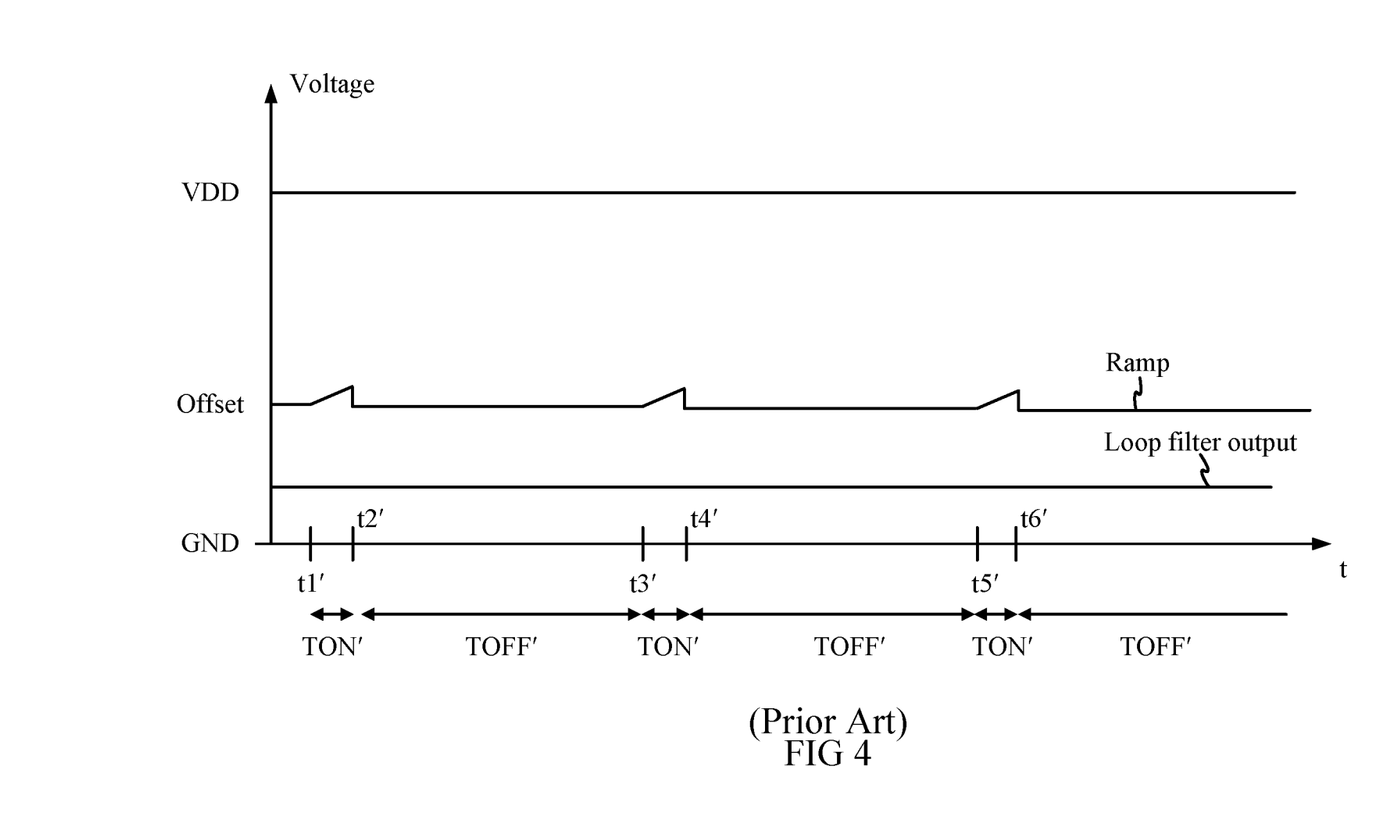
FIG. 4 illustrates exemplary signal waveforms present in the buck converter during a transient period associated with a scenario wherein it is desired to quickly reduce Vout from a first level V1 to a second level V2 less than V1.

FIG. 4 illustrates exemplary signal waveforms present in the buck converter 100 during a transient period associated with a scenario wherein Vout is reduced from a first level V1 to a second level V2 less than V1. In particular, Vref may be set to a value less than the sampled voltage Vfb, causing Loop filter output to be less than Ramp. In this case, the charging phase will only last for a minimum duration TON' from t1' to t2', during which time P1 will be turned on and N1 will be turned off. Note in the instance shown, TON' is a non-zero minimum time interval for which P1 is always on during each cycle, regardless of the relationship between Ramp and Loop filter output.

At t2', the discharging phase commences and lasts for a duration TOFF' to t3'. Note P1 is turned on during TON' even though Loop filter output is less than Ramp, as the buck converter implementation 100 shown in FIG. 4 imposes a minimum on-time TON' for all cycles. Note while the minimum on-time TON' in FIG. 4 is shown as being a non-zero time interval, in alternative exemplary embodiments, the minimum duration TON' may be zero, in which case P1 may be turned off the entire time when Loop filter output is less than Ramp. Further note the waveforms in FIG. 4 are drawn according to scale, and further are not meant to imply any specific relationships between the minimum on-time TON' and the cycle duration.

Figure 5:
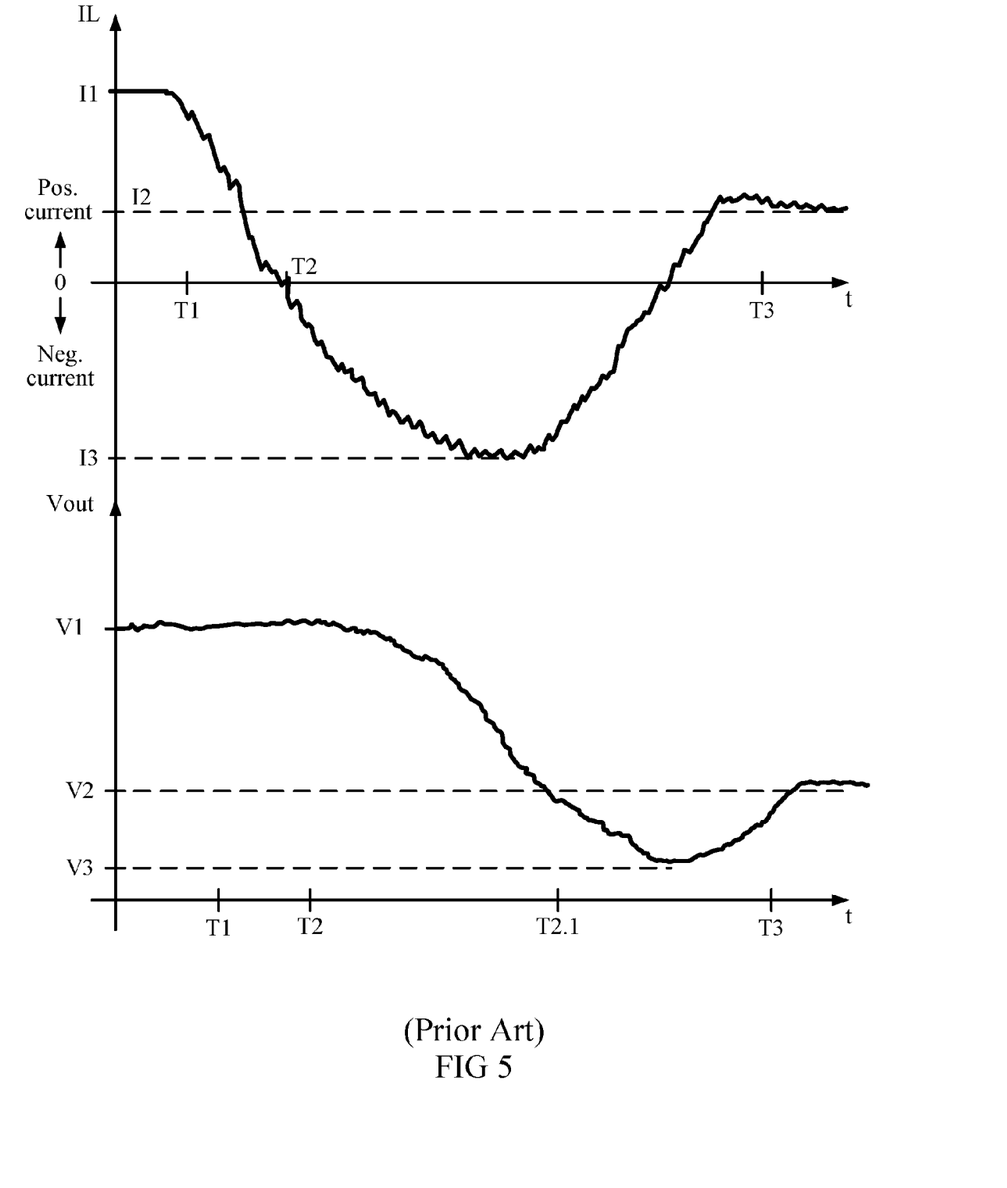
FIG. 5 illustrates exemplary voltage and current waveforms present in the buck converter, during a transition in which the target value of Vout is brought from a first level V1 down to a second level V2 considerably less than V1.

FIG. 5 illustrates exemplary voltage and current waveforms present in the buck converter 100, during a transition in which the target value of Vout is brought from a first level V1 down to a second level V2 considerably less than V1. Note the waveforms in FIG. 5 are shown for illustrative purposes only, and are not meant to suggest that signal waveforms will necessarily have the profiles shown.

In FIG. 5, prior to time T1, the current IL initially has a positive value I1, and the corresponding output voltage Vout has a first value V1. At T1, IL begins to decrease, e.g., in response to a setpoint of Vout being decreased from V1 to a lower level V2. As IL decreases, it eventually becomes negative, crossing zero current at time T2. Vout correspondingly starts to decrease at T2, when IL becomes negative (assuming the load current is zero). Following T2, once the corresponding Vout becomes less than V2, then IL will eventually start to increase (after decreasing to as low as I3), and once again become positive. In conjunction, Vout will also start to increase, and eventually settle close to its target level around time T3. Thereafter, IL and Vout will settle to their steady-state levels (e.g., IL at I2 and Vout at V2), until a next change in the target value of Vout.

It will be appreciated from the above description that there are at least two problems associated with using reverse boost mode to rapidly reduce Vout. First, during reverse boost mode, the current IL through N1 may become increasingly negative without bound, which may have adverse consequences due to the limited power handling capability of the system. Second, it may take a considerable additional amount of time to bring Vout to the target level due to undershoot characteristics of the system as further described hereinbelow.

In particular, in FIG. 5, it can be seen that following T1, the level of Vout crosses the target value of V2 twice: once at time T2.1, and once again at T3. In the time duration between T2.1 and T3, Vout may be characterized as being in a state of "undershoot," wherein the transient value of Vout temporarily is less than the target value of V2, and later increases back to V2. For example, between T2.1 and T3, Vout may decrease to as low as V3, before starting to increase again. It will be seen that this undershoot is due at least in part to the large negative current IL established after T2. A significant amount of time is required to discharge the negative current from the inductor L and to re-charge L back to a positive, steady-state current to sustain the target output voltage V2. It will be appreciated that the aforementioned scenario is an obstacle to achieving fast settling times for current mode buck converters in reverse boost mode.

It would be desirable to provide techniques to feed information regarding the inductor current IL back into the control loop, and, in particular, to back off the amount of negative current through IL as Vout approaches the target voltage to reduce undershoot and settling time.

Figure 6:
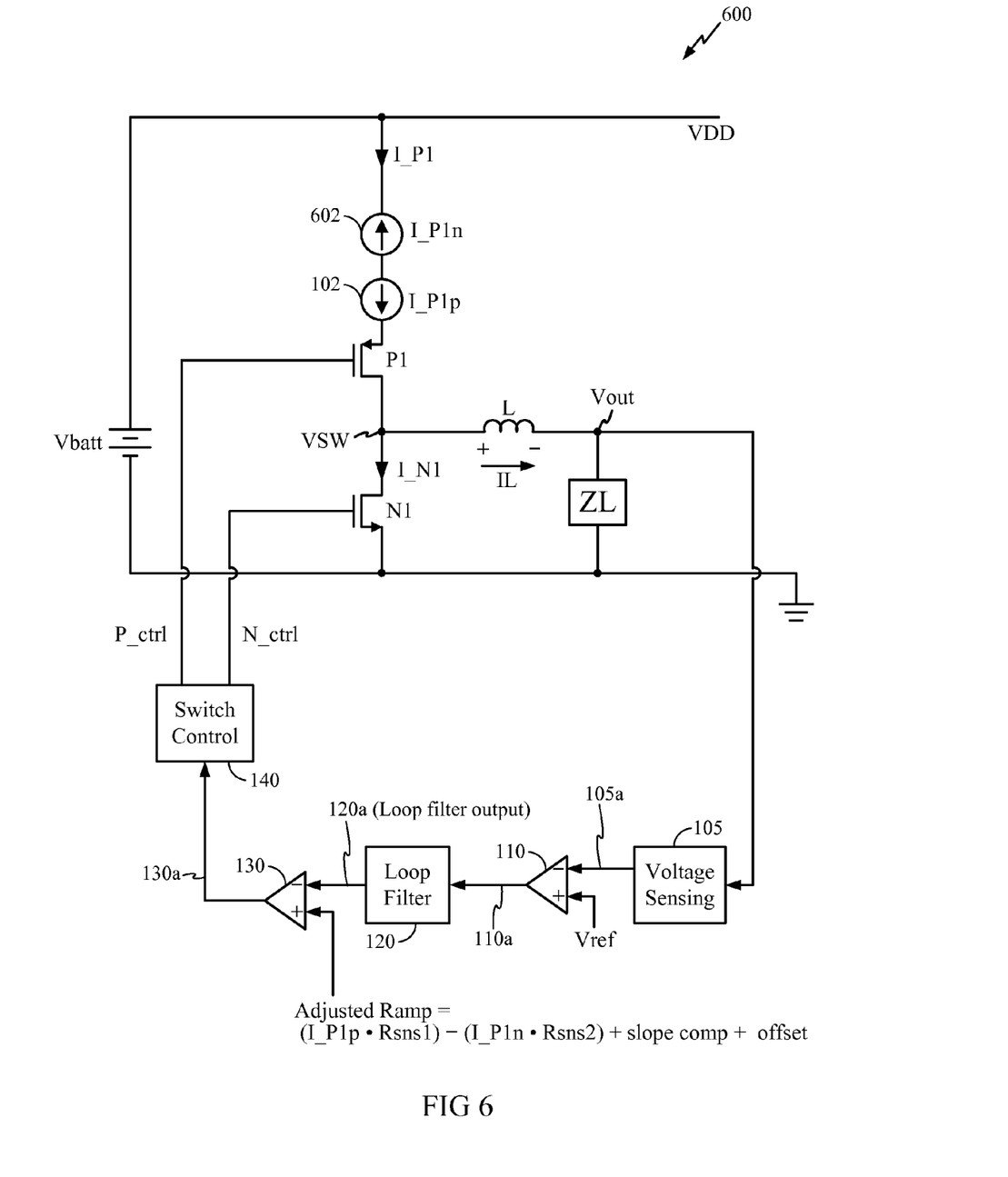
FIG. 6 illustrates an exemplary embodiment of the present disclosure, wherein negative current flow through the PMOS switch P1 is sensed and fed back to the control loop of the buck converter.

FIG. 6 illustrates an exemplary embodiment of the present disclosure, wherein negative current flow through the PMOS switch P1 is sensed and fed back to the control loop of the buck converter 600. Note similarly labeled elements in FIGS. 1 and 6 may correspond to elements having similar functionality, unless otherwise noted. In FIG. 6, a negative current sensor 602 is provided to sense the magnitude of negative current I_P1n through P1. (Note according to the conventions adopted herein, a negative measured value for I_P1 will correspond to a positive I_P1n.) In the exemplary embodiment shown, the output I_P1n of the negative current sensor 602 is used to generate an "Adjusted ramp" signal for the comparator 130, wherein Adjusted ramp is defined as follows, when P1 is on (Equation 2):

Adjusted ramp=(I_P1p·Rsns1)−(I_P1n·Rsns2)+Slope comp+Offset;

wherein I_P1n is the sensed negative current through P1, and Rsns2 is a resistance (not shown in FIG. 6). From comparing Equation 2 with Equation 1, it will be appreciated that, when inductor current IL is positive, Adjusted ramp is equal to Ramp; however, when IL is negative, Adjusted ramp will be less than Ramp, due to the term (I_P1n·Rsns2). Furthermore, Adjusted ramp will be increasingly less than Ramp as IL becomes more negative.

From FIG. 6, it will accordingly be appreciated that the lower value of Adjusted ramp at the positive (+) input terminal of comparator 130 will generate a PWM output voltage 130a with a longer TON/shorter TOFF than a corresponding value of Ramp. In other words, using Adjusted ramp per Equation 2, the PMOS on-time will be progressively increased as the inductor current IL becomes increasingly negative, which will in turn prevent IL from further becoming increasingly negative without bound.

Figure 7:
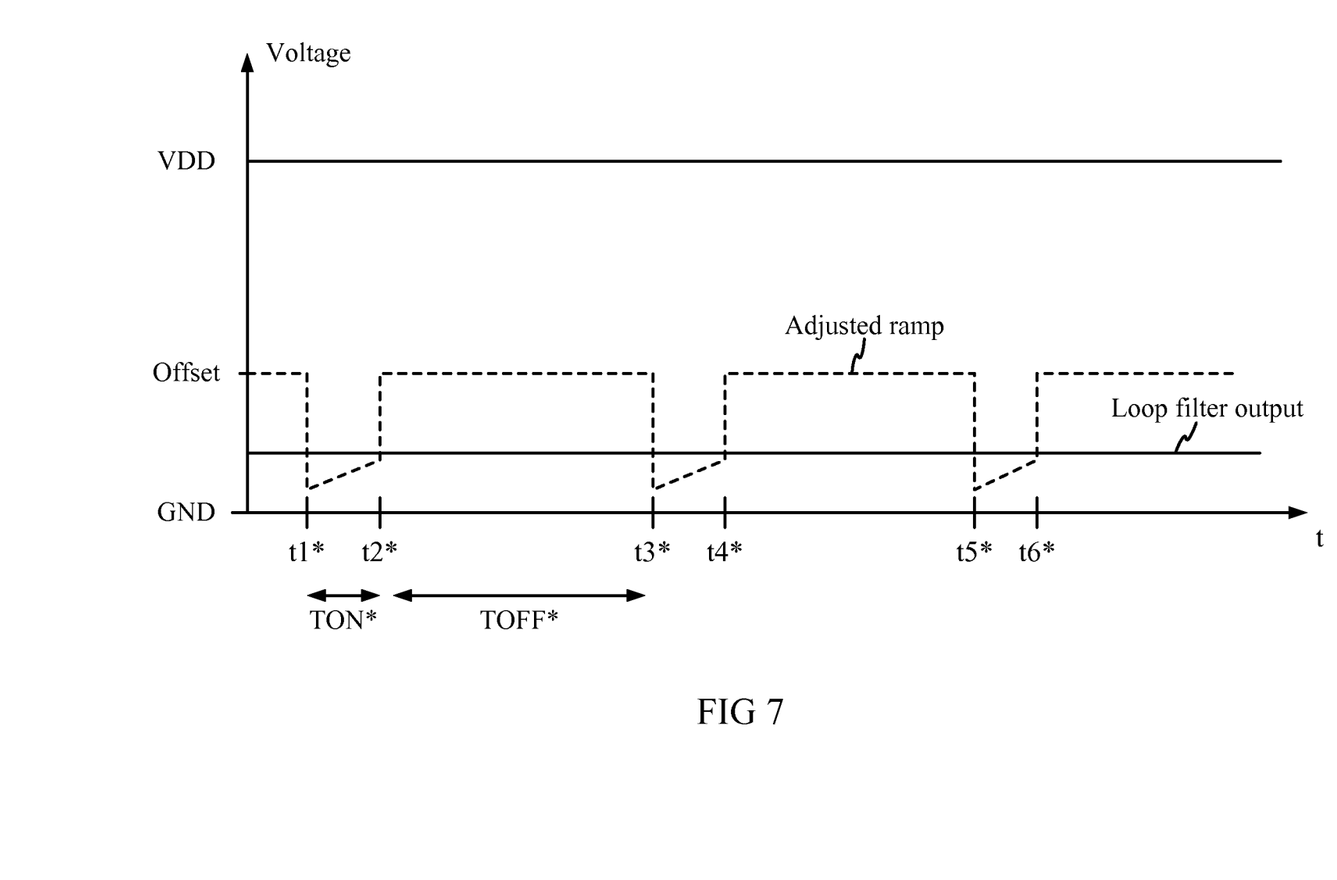
FIG. 7 illustrates exemplary signal waveforms present in the buck converter during a period when Vout transitions from V1 to V2, wherein negative current through P1 is provided as feedback to the control loop described hereinabove.

FIG. 7 illustrates exemplary signal waveforms present in the buck converter 600 during a period when Vout transitions from V1 to V2, wherein negative current through P1 is provided as feedback to the control loop described hereinabove. Note FIG. 7 is shown for illustrative purposes only, and is not meant to limit the scope of the present disclosure to any exemplary signal waveforms shown.

In FIG. 7, Adjusted ramp is shown as a dashed line. The time interval shown (e.g., from before t1* to after t6*) corresponds to a period of time during which Vout is transitioning from V1 to V2, and, in particular, wherein negative current IL flows through the inductor L. During these times, when P1 is on, I_P1n will have positive magnitude (due to negative IL being detected), and thus Adjusted ramp will be correspondingly reduced as according to Equation 2. For example, in FIG. 7, for a duration TON* between times t1* and t2*, P1 is on, and Adjusted ramp is seen to decrease from a level Offset greater than Loop filter output prior to t1* to a level less than Loop filter output at t1*. Following t2*, for a duration TOFF* between t2* and t3*, P1 is off and N1 is on. At t3*, the cycle is repeated.

Figure 8:
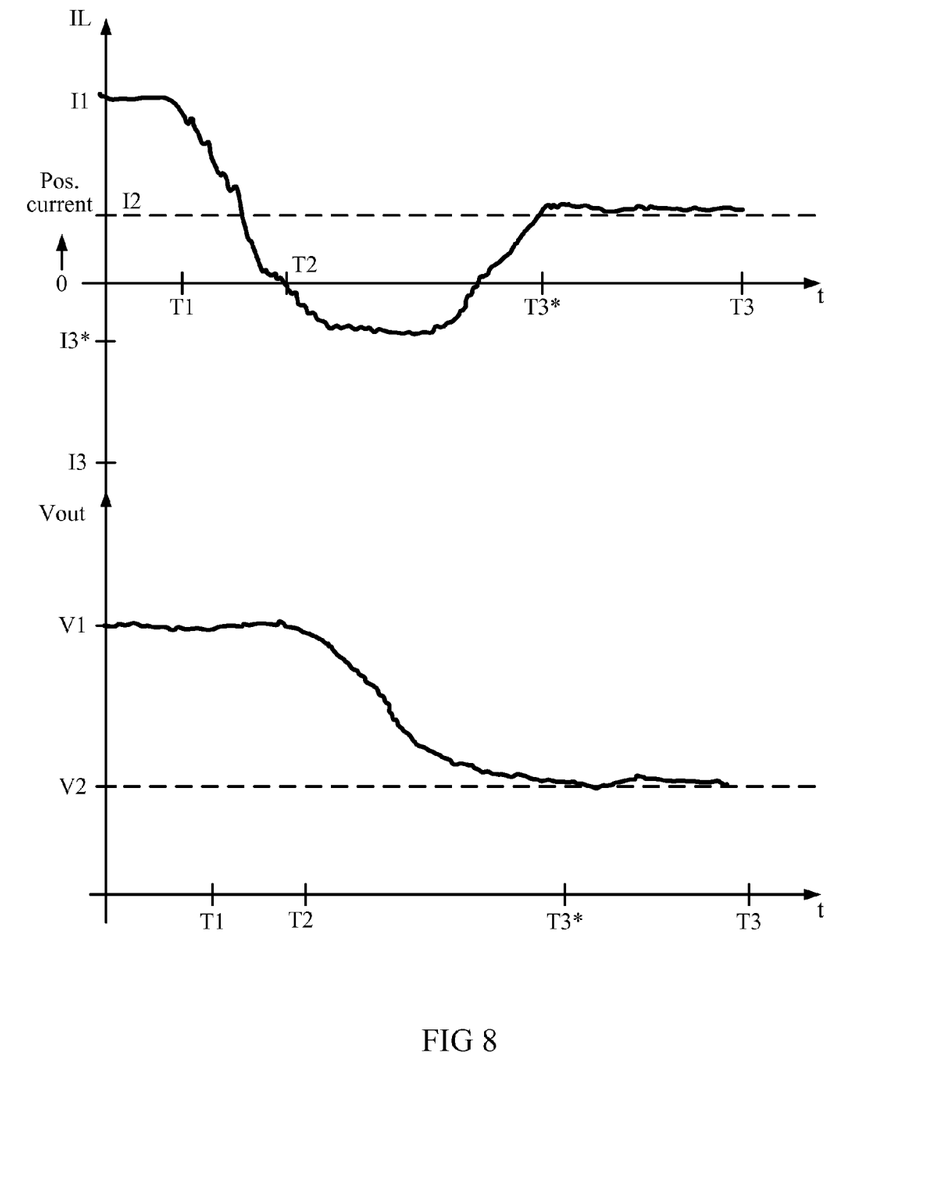
FIG. 8 illustrates exemplary voltage and current waveforms present in the buck converter during a transition in Vout from V1 to V2, wherein negative current through P1 is used to adjust the control loop according to the present disclosure.

FIG. 8 illustrates exemplary voltage and current waveforms present in the buck converter 600 during a transition in Vout from V1 to V2, wherein negative current through P1 is used to adjust the control loop according to the present disclosure. Note the waveforms in FIG. 8 are shown for illustrative purposes only, and are not meant to suggest that signal waveforms will necessarily have the profiles shown. Note similarly labeled variables in FIGS. 5 and 8 may have similar values unless otherwise noted; for example, the exemplary levels of V1 and V2 in FIG. 8 may correspond to the same levels described with reference to FIG. 5.

In FIG. 8, similar to FIG. 5, the current IL initially has a positive value I1 at T1, and the corresponding output voltage Vout has a first value V1. At T1, IL begins to decrease, e.g., in response to a setpoint of Vout being decreased from V1 to a lower level V2. As IL decreases, it eventually becomes negative, crossing zero at time T2. When IL becomes negative, then I_P1$n$ as sensed by sensor 602 will be positive. As earlier described hereinabove, a positive I_P1$n$ decreases Adjusted ramp relative to Ramp, thereby increasing the P1 turn-on time TON* relative to the implementation profiled in FIG. 5. IL decreases to as low as I3* before increasing again to I2.

Due to the presence of the term I_P1$n$ in Adjusted ramp, it will be appreciated that I3* is considerably greater (i.e., less negative) than the negative current I3 shown in FIG. 5. Correspondingly, Vout is seen to settle to the target value of V2 at time T3*, which is significantly earlier than the time T3 corresponding to the implementation profiled in FIG. 5. It will thus be appreciated from the above description that the time needed to transition from V1 to V2 will be significantly less for the buck converter 600 than for the buck converter 100.

It will be appreciated that an advantage of the techniques described herein is that, by incorporating the negative P1 current I_P1$n$ to generate Adjusted ramp per Equation 2 in the manner described, the same control logic incorporated by, e.g., the switch control block 140, can be re-used with minimal modifications, thereby introducing minimal additional complexity to the control system. In particular, linear and continuous control techniques may be adopted for the buck converter 100. Furthermore, the control system advantageously does not need to accommodate switching between separate "forward buck" and "reverse boost" states, thereby improving system stability.

Figure 9:
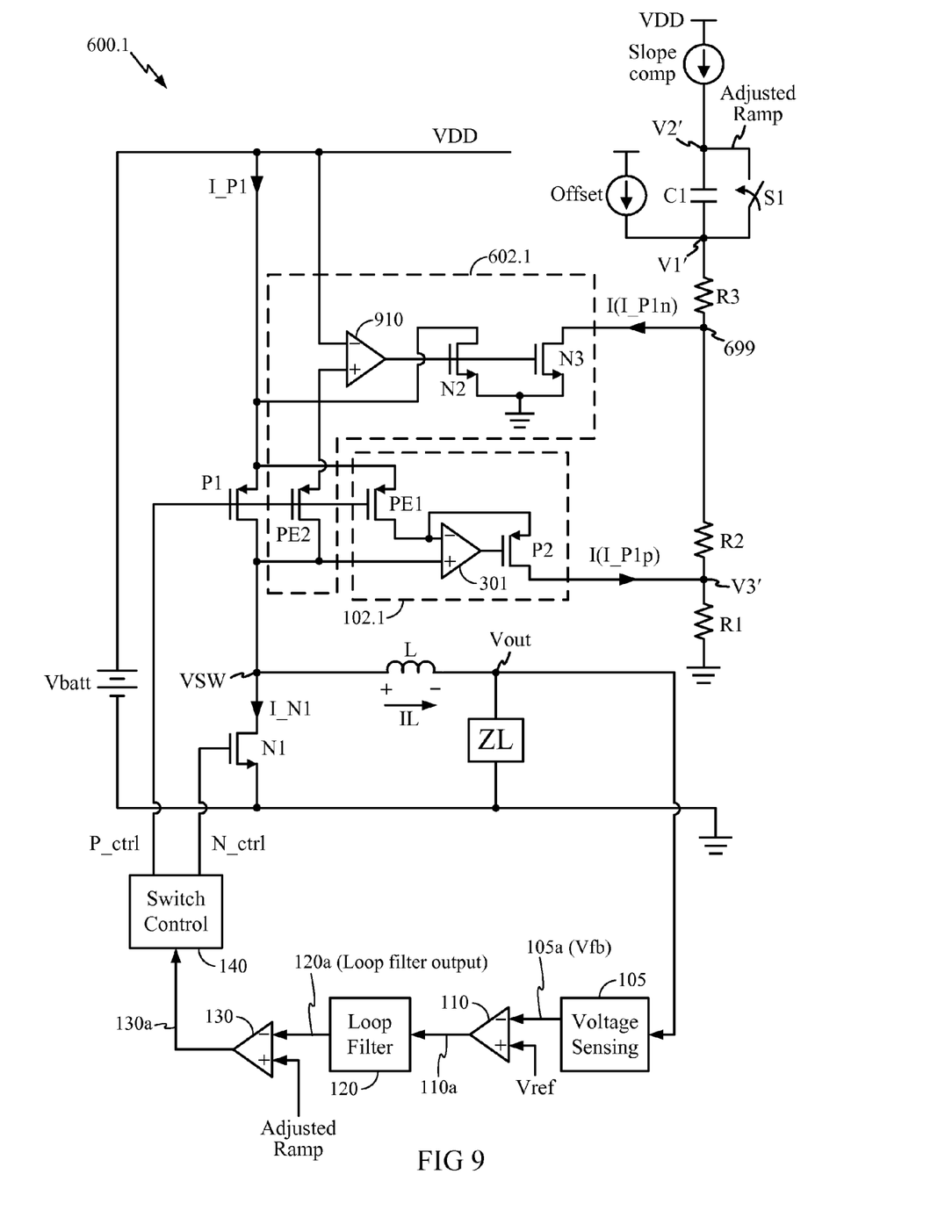
FIG. 9 illustrates an exemplary implementation of the buck converter in FIG. 6.

FIG. 9 illustrates an exemplary implementation 600.1 of the buck converter 600. Note FIG. 9 is shown for illustrative purposes only, and is not meant to limit the scope of the present disclosure to only the exemplary embodiment of the buck converter 600 shown in FIG. 6.

In FIG. 9, the sensor 602 of FIG. 6 is implemented using circuitry 602.1 including a feed-through PMOS transistor PE2 coupling VSW to the positive (+) input of an amplifier 910. The negative (−) input of amplifier 910 is coupled to Vbatt. In this manner, amplifier 910 generates a voltage proportional to (VSW minus Vbatt) at the gate of NMOS transistor N2, whose drain is coupled to the drain of PE2. The gate voltage of N2 is further provided to an NMOS transistor N3, also denoted a "negative-current" transistor, whose drain is coupled to a node 699. Node 699 is in turn coupled to V3' via R2, wherein V3' is also coupled to the output of the positive current sensor 102.1. Node 699 is further coupled to V1' via R3, wherein V1' is coupled to the Offset current source, C1, and switch S1.

In particular, during reverse boost mode, VSW is expected to be larger than Vbatt when P1 is on, and thus N3 is expected to be turned on, generating a drain current I(I_P1$n$) that is a linear function of negative P1 current, with the polarity indicated. It will be seen that I(I_P1$n$) is subtracted from the currents Offset and I(I_P1$p$) that would otherwise flow through resistors R1 and R2, and thus the voltage V1' at a first plate of capacitor C1 is expected to be correspondingly less as a result of I(I_P1$n$).

Figure 10:
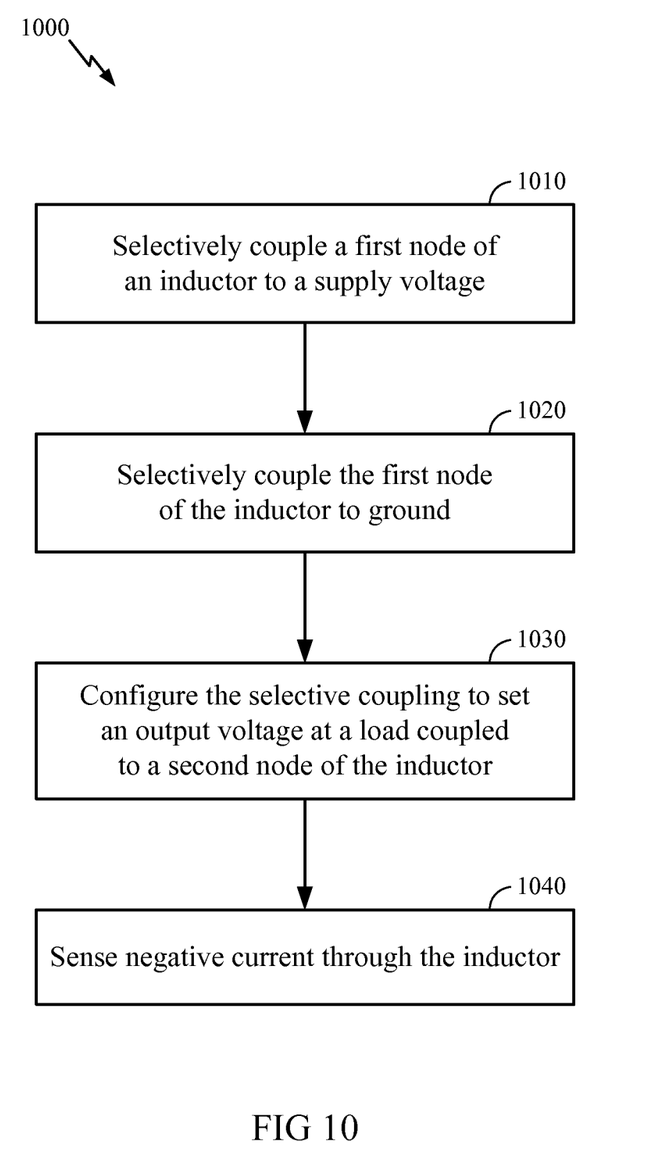
FIG. 10 illustrates an exemplary embodiment of a method according to the present disclosure.

FIG. 10 illustrates an exemplary embodiment of a method 1000 according to the present disclosure. Note the method 1000 is shown for illustrative purposes only, and is not meant to restrict the scope of the present disclosure.

At block 1010, a first node of an inductor is selectively coupled to a supply voltage.

At block 1020, the first node of the inductor is selectively coupled to ground.

At block 1030, the selective coupling is configured to set an output voltage at a load coupled to a second node of the inductor. The configuring may comprise comparing a filtered error voltage to an adjusted ramp voltage.

At block 1040, negative current is sensed through the inductor, wherein the adjusted ramp voltage comprises an additive term that reduces the adjusted ramp voltage in response to negative current being sensed.

Note while exemplary embodiments have been described hereinabove wherein a PMOS transistor is used as the charging switch (e.g., in the exemplary embodiment 600 of FIG. 6) coupling the inductor L to Vbatt, the techniques described may readily be utilized in alternative exemplary embodiments employing elements other than a PMOS transistor for the charging switch. For example, in an alternative exemplary embodiment (not shown), an NMOS switch may also be utilized, and the negative current through the NMOS (charging) switch may be sensed and utilized per the techniques described herein. Such alternative exemplary embodiments are contemplated to be within the scope of the present disclosure.

It will be appreciated that any types of applications incorporating buck converters may utilize the techniques of the present disclosure. For example, in certain exemplary embodiments, a buck converter incorporating the techniques described herein may be applied to average power tracking (APT) schemes, switched-mode battery chargers (SMBC's), and fast transient supply (FTS) schemes known in the art. Such exemplary embodiments are contemplated to be within the scope of the present disclosure.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. An apparatus comprising:
a charging switch configured to selectively couple a first node of an inductor to a supply voltage;
a discharging switch configured to selectively couple the first node of the inductor to ground;
a circuit configured to generate a ramp voltage;
a control block configured to control the charging and discharging switches to set an output voltage at a load coupled to a second node of the inductor based on the ramp voltage;
a positive current sense block to sense positive current through the inductor, wherein the circuit is configured to generate the ramp voltage based on the positive current being sensed; and
a negative current sense block configured to sense negative current through the inductor, wherein the circuit is further configured to adjust the ramp voltage in response to sensing of the negative current through the inductor,
wherein the circuit comprises a series of resistors having a first terminal and a second terminal, the circuit being configured to couple to an output of the positive current sense block via the first terminal and to couple to an output of the negative current sense block via the second terminal.

2. The apparatus of claim 1, wherein the charging switch comprises one of a PMOS transistor and an NMOS transistor.

3. The apparatus of claim 1, the negative current sense block configured to sense negative current through the charging switch.

4. The apparatus of claim 3, the negative current sense block comprising an amplifier configured to sense a voltage drop across the charging switch corresponding to negative inductor current.

5. The apparatus of claim 4, the negative current sense block further comprising:

a feed-through transistor coupled to a control voltage of the charging switch, wherein the amplifier has an input terminal coupled to the feed-through transistor wherein an output of the amplifier is coupled to a negative-current transistor, and wherein the negative-current transistor has a drain coupled to circuitry for generating current proportional to the adjusted ramp voltage.

6. The apparatus of claim 5, the circuitry for generating current proportional to the adjusted ramp voltage comprising an offset current source and a slope compensation current source.

7. The apparatus of claim 1, wherein the control block is further configured to adjust an ON period of the charging switch in response to the adjusted ramp voltage.

8. The apparatus of claim 1, the control block configured to implement a linear and continuous control loop system to set the output voltage.

9. The apparatus of claim 1, wherein the charging and discharging switches, the control block, and the negative current sense block are incorporated in a buck converter, and the buck converter is used in an average power tracking scheme, a switched-mode battery charger, or as a fast transient supply buck converter.

10. A method comprising:

selectively coupling a first node of an inductor to a supply voltage;

selectively coupling the first node of the inductor to ground;

generating a ramp voltage via a series of resistors having a first terminal and a second terminal;

configuring the selective coupling to set an output voltage at a load coupled to a second node of the inductor based on the ramp voltage;

sensing negative current through the inductor;

sensing positive current through the inductor;

coupling a first current based on the sensed positive current to the first terminal;

coupling a second current based on the sensed negative current to the second terminal; and adjusting the ramp voltage in response to the sensing of the negative current through the inductor.

11. The method of claim 10, the sensing the negative current through the inductor comprising sensing negative current through a charging switch for selectively coupling the first node of the inductor to the supply voltage.

12. The method of claim 11, the sensing the negative current comprising sensing a voltage drop across the charging switch further comprising adjusting an ON period of the charging switch in response to the adjusting the ramp voltage.

13. The method of claim 11, wherein the charging switch comprises one of a PMOS transistor and an NMOS transistor.

14. The method of claim 11, the sensing the negative current through charging switch being performed during a time interval when the charging switch is enabled in the ON period to couple the first node of the inductor to the supply voltage.

15. An apparatus comprising:

means for selectively coupling a first node of an inductor to a supply voltage through a charging switch;

means for selectively coupling the first node of the inductor to ground;

means for generating a ramp voltage via a series of resistors having a first terminal and a second terminal;

means for configuring the selective coupling to set an output voltage at a load coupled to a second node of the inductor based on the ramp voltage;

means for sensing positive current through the inductor and outputting a first current-coupled to the first terminal; and means for sensing negative current through the inductor and outputting a second current-coupled to the second terminal, wherein the means for generating the ramp voltage adjusts the ramp voltage in response to sensing of the negative current through the inductor.

16. The apparatus of claim 15, the means for sensing negative current through the inductor further comprising means for sensing negative current through the charging switch.

17. The apparatus of claim 15, further comprising means for adjusting an ON period of the charging switch in response to the adjusting the ramp voltage.

* * * * *